Patented Oct. 18, 1932

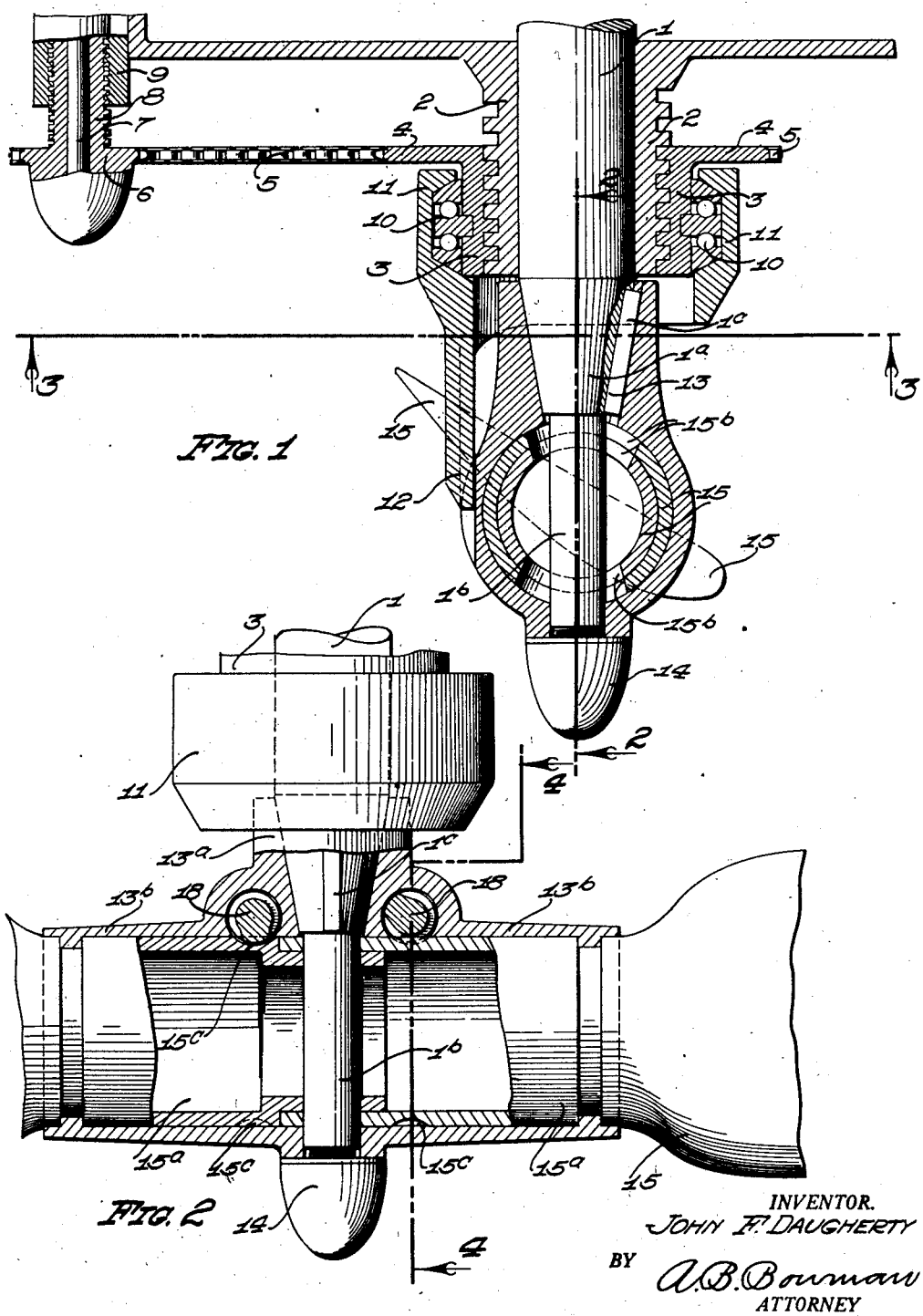

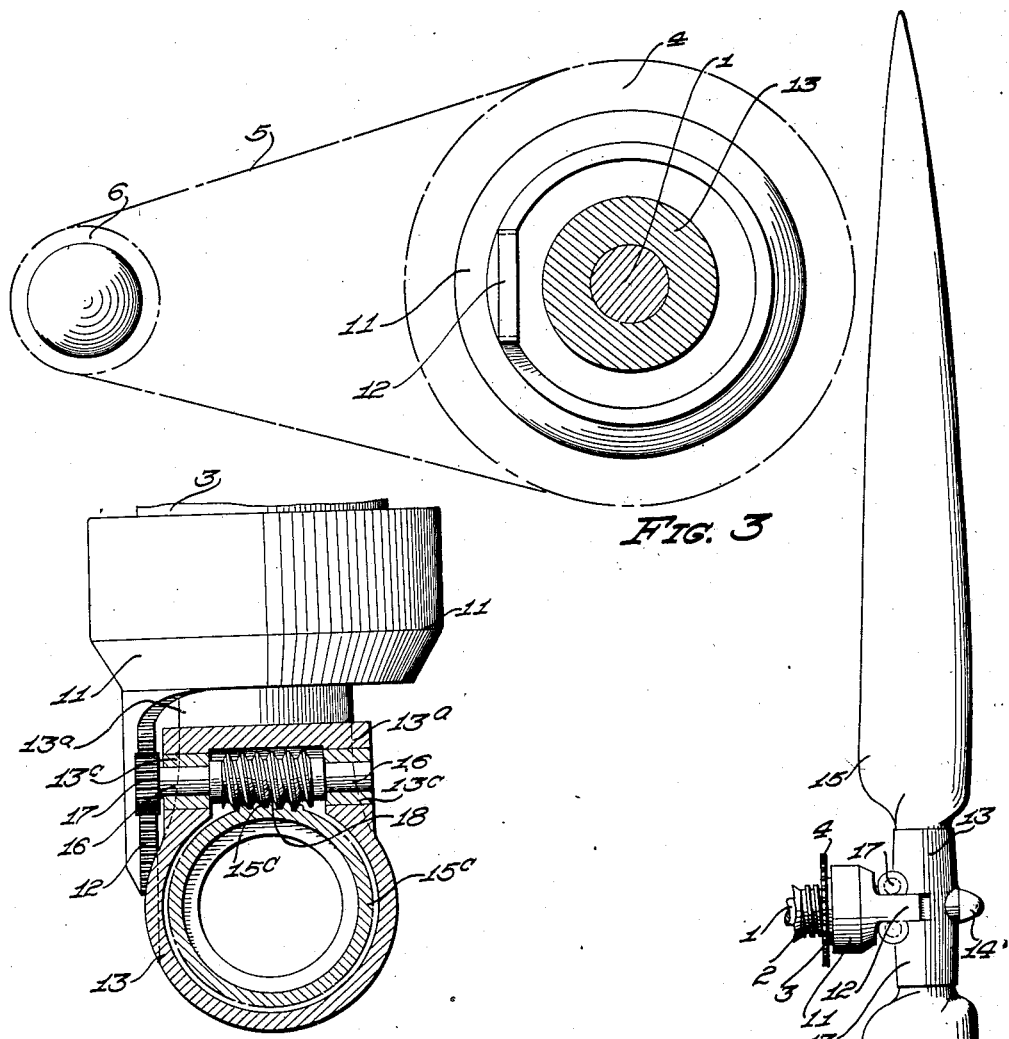

1,883,340

UNITED STATES PATENT OFFICE

JOHN F. DAUGHERTY, OF SAN DIEGO, CALIFORNIA, ASSIGNOR OF ONE-HALF TO JOHN W. DAUGHERTY, OF SAN DIEGO, CALIFORNIA

VARIABLE PITCH PROPELLER

Application filed October 3, 1928. Serial No. 310,025.

My invention relates to variable pitch propellers and the objects of my invention are: First, to provide a propeller of this class which is especially adapted for aircrafts; second, to provide a propeller of this class whereby it is instantly and readily varied while in flight; third, to provide a propeller of this class which is adaptable to all kinds and makes of aircraft; fourth, to provide a propeller of this class which may be installed on a conventional aircraft with a minimum of change in the structure thereof; fifth, to provide a propeller of this class which may be varied so as to act as a brake when landing, thus offsetting the tendency of the wheel brakes to lift the tail of the aircraft and nose said aircraft into the ground; sixth, to provide a propeller of this class which when acting as a brake in conjunction with the ordinary wheel brakes of an aircraft reduces to a minimum the distance necessary for landing; seventh, to provide a propeller of this class which affords better and more accurate control of an aircraft in taking off or landing; eighth, to provide a propeller of this class which greatly facilitates the maneuvering of an aircraft when in flight; ninth, to provide a propeller of this class which enables airplanes carrying abnormally heavy loads to travel rapidly after takeoff by increasing the pitch of the airplane propeller as the aircraft gains speed; tenth, to provide a propeller of this class which enables the pilot to vary the traction power of an aircraft while in flight; eleventh, to provide a propeller of this class which is positive and dependable in action and which is in no way less strong than the conventional aircraft propeller, and twelfth, to provide a propeller of this class which is simple of construction proportional to its functions, durable, efficient in its actions and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a sectional view thereof with parts and portions shown in elevation to facilitate the illustration and with a portion of an aircraft engine shown fragmentarily; Fig. 2 is another sectional view thereof at right angles to Fig. 1, taken through 2—2 thereof with parts and portions in elevation to facilitate the illustration, and the propeller blades shown fragmentarily; Fig. 3 is a sectional view thereof through 3—3 of Fig. 1 with parts and portions in elevation to facilitate the illustration; Fig. 4 is another sectional view through 4—4 of Fig. 2 with parts and portions in elevation to facilitate the illustration, and Fig. 5 is a reduced side elevational view with one of the propeller blades and supporting member shown fragmentarily.

Similar characters of reference refer to similar parts and portions throughout the several views of the drawings.

Propeller shaft 1, screw member 2, bushing 3, driven sprocket wheel 4, sprocket chain 5, driving sprocket 6, operating shaft 7, bushing 8, screw member 9, bearing member 10, traveler member 11, rack member 12, hub member 13, cap bolt 14, propeller blades 15, pinion gear shaft members 16, pinion gears 17, worms 18, constitute the principal parts and portions of my variable pitch propeller.

The propeller shaft 1 is similar to the conventional propeller shaft except that its end portion is shaped to receive the pitch varying mechanism. The propeller shaft after leaving the forward supporting bearing, not shown, of the airplane engine, passes through a screw member 2, the inner surface of which may also form a bearing. This screw member 2 is supported or secured in any manner to the forward or propeller side of the aircraft. The outer periphery of the screw member 2 is provided with threads which are relatively coarse and adapted to stand a considerable strain. Screwably mounted upon the screw member 2 is a bushing member 3.

Secured or formed integral with the bushing member 3 is a driven sprocket wheel 4 which is operated through a sprocket chain 5 by a driving sprocket 6. The driving sprocket 6 is mounted upon an operating shaft which extends back to the cockpit or control board of the aircraft, not shown. Secured to or made integral with the driving sprocket 6 is a bushing member 8 having external threads adapted to engage internal threads on a screw member 9. The screw member 9 is fastened to a portion of the engine housing in any suitable manner. The bushing member 8 and bushing member 3 have the corresponding size threads so that the sprocket wheels 4 and 6 will remain substantially in the same plane at all times. Thus, if the driving sprocket 6 is one-fourth the diameter of the driven sprocket wheel the threads on the screw member 9 and bushing member 8 will be one-fourth the size of the threads on the screw member 2 and the bushing member 3.

Rotatably mounted on the bushing member 3 by means of a bearing member 10 is a traveler or collar member 11 having an arm secured to or integral therewith which extends outwardly parallel with and spaced apart from the axis of the propeller shaft. This arm forms a rack member 12, as shown in Figs. 1, 3, 4 and 5 of the drawings, which has two sets of teeth, one set on either side.

The propeller shaft is provided with a tapered portion 1a over which fits the shank or stem portion 13a of the substantially T-shaped hub member 13. The cross portion 13b of the hub member is hollow and forms a sleeve for the shank portions 15a of propeller blades 15. A reduced portion 1b of the crankshaft 1 extends from the tapered portion 1a of the propeller shaft through the cross portion 13b of the hub member and is provided at its end with a suitable cap bolt 14 for holding the hub member rigidly in place. Suitable keyways 1c are provided in the tapered portion for preventing the rotation of the propeller shaft relative to the hub.

The propeller blades may be of any suitable design; may be made out of wood or metal; but in any case the inner ends of their shank portions 15a are adapted to telescope within each other so as to be rigidly held against vibration, as shown best in Figs. 1 and 2 of the drawings. Slots 15b are provided in the telescoped portion of each propeller blade shank 15a through which the stem 1b of the propeller shaft extends, thus permitting arcuate movement of the blades about the axis of the cross member 13b of the hub. In addition to the slots 15b, other means such as annular ridges or grooves may be provided in the propeller blade shank so as to interlock with the hub and prevent radial movement of the propeller blades.

Mounted in bearings 13c at the junction of the stem 13a of the hub with the cross portion 13b thereof, and extending at right angles to the axis of the propeller shaft are a pair of shaft members 16. The one end of each shaft member protrudes from its mounting and is provided with a pinion gear 17 which engages one side of the rack member 12; the rack 12 having teeth means on each side thereof for engaging the pinion gears 17, as shown best in Figs. 4 and 5 of the drawings. Mounted intermediate the ends of each shaft 16 is a worm 18, the teeth of which engage gear teeth 15c which extend around the periphery of each propeller shank adjacent to the stem portion 1b of the propeller shaft, as shown best in Figs. 2 and 4 of the drawings.

Thus, rotation of the operating shaft 7 causes the sprockets 6 and 4, to revolve, and to travel forwardly or backwardly in alinement with each other by means of their bushing members. The bushing member 3, which is independent of the rotation of the propeller shaft, causes the traveler member 11 and the rack member 12 by means of the bearing 10, to shift axially while revolving with the propeller shaft. This reciprocal movement of the rack member 12 rotates the pinion gears 17, the shaft members 16, and the worms 18 thereon. The pinion gears, shaft and worms of each set revolve in opposite directions, and turn one propeller blade in one direction while the other blade turns a corresponding amount in the other direction, thereby maintaining the propeller blades at the same corresponding pitch at all times.

The traveler member 11, rack member 12 and hub member 13 all revolve with the propeller blades, while the sprockets 4 and 6 and the bushings 3 and 8 remain stationary except for the few revolutions necessary to make adjustment of the blades. Thus, it is possible to vary the pitch of the propeller blades while the motor is running and while the aircraft is in flight. If desired, of course, the sprocket wheels 4 and 6 may be gears instead, thereby eliminating the chain 5. Thus, it can be seen that the propeller blades are held rigidly in any position, yet permitting instant adjustment. Although a direct link means may be substituted in place of the rack and worm members, the propeller blades would produce a considerable back force on the traveler member 11 causing considerable difficulty in adjustment, whereas the worm member eliminates or reduces to a minimum this trouble.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a variable pitch propeller, a plurality of propeller blades, a hub rotatably supporting said blades, means for preventing radial movement of said propeller blades, a propeller shaft secured to said hub, a worm gear and rack traveler means rotatable with said propeller shaft and axially shiftable relative thereto for co-operating with said hub member for rotating said propeller blades, and screw and chain means for shifting said traveler means axially relative to said propeller shaft.

2. In a variable pitch propeller, a plurality of propeller blades, a hub for securing said propeller blades against radial movement but permitting rotatable movement relative to said hub, a propeller shaft secured to said hub, a worm gear and rack traveler means rotatable with said propeller shaft and axially shiftable relative thereto for co-operating with said hub member for rotating said propeller blades, and screw and chain means for shifting said traveler means axially relative to said propeller shaft.

3. In a propeller pitch varying means, a propeller shaft, a hub therefor, propeller blades arcuately movable relative to said hub, a traveler means rotatable with said propeller shaft and axially shiftable relative thereto, worm gear and rack means connecting said traveler member with said propeller blades for transmitting the axial movement thereof to an arcuate movement of said propeller blades, and screw means operated independent of the rotation of said propeller shaft for shifting said traveler member axially relative thereto.

4. In a propeller pitch varying means, a propeller shaft, propeller blades rotatable therewith, the pitch of said propeller blades being shiftable, a traveler member rotatable with said propeller shaft and axially shiftable relative thereto, worm gear and rack means connecting said traveler member with said propeller blades for causing the axial movement of said traveler member to shift the pitch of said propeller blades, and screw means operated independent of the rotation of said propeller shaft for shifting said traveler member axially relative thereto.

In testimony whereof, I have hereunto set my hand at San Diego, California this 26th day of September 1928.

JOHN F. DAUGHERTY.